F. SCHIMMEL.
SHOCK ABSORBER.
APPLICATION FILED DEC. 11, 1911.
1,046,656.
Patented Dec. 10, 1912.
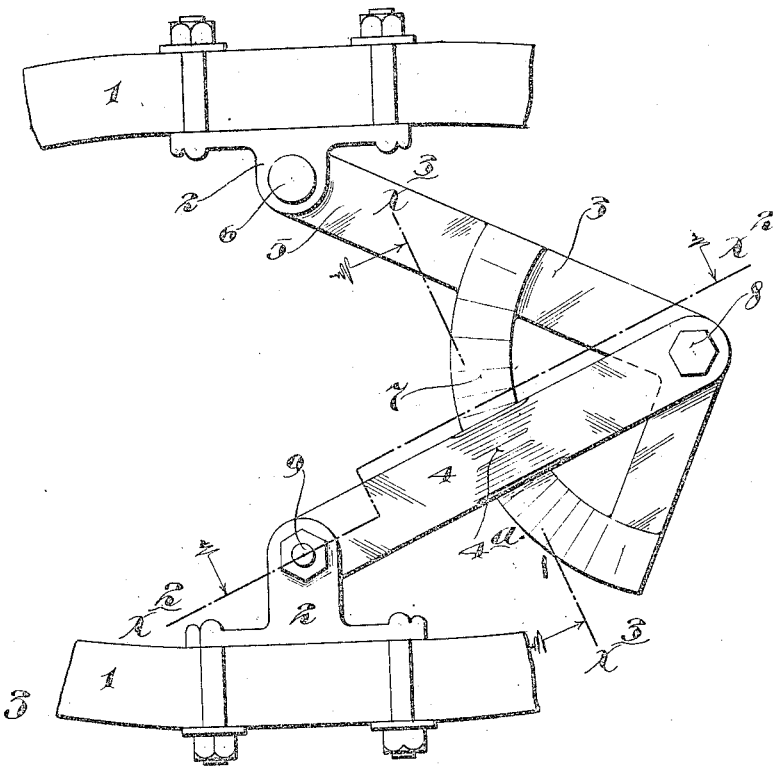
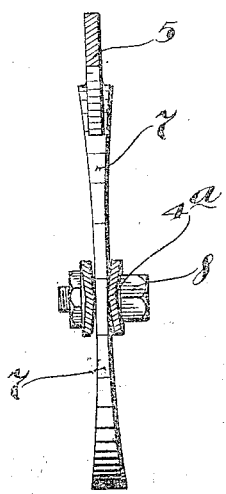
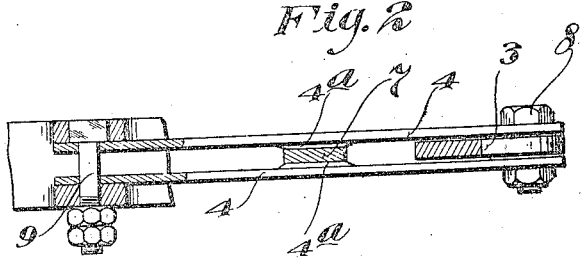
Witnesses:
E. C. Skinkle
Edith Simerman
Inventor,
Fridolin Schimmel
By his Attorneys,
Williamson Michaud

UNITED STATES PATENT OFFICE.

FRIDOLIN SCHIMMEL, OF FARIBAULT, MINNESOTA.

SHOCK-ABSORBER.

1,046,656.

Specification of Letters Patent. Patented Dec. 10, 1912.

Application filed December 11, 1911. Serial No. 664,996.

*To all whom it may concern:*

Be it known that I, FRIDOLIN SCHIMMEL, a citizen of the United States, residing at Faribault, in the county of Rice and State of Minnesota, have invented certain new and useful Improvements in Shock-Absorbers; and I do hereby declare the following to be a full, clear, and exact description of the invention, such as will enable others skilled in the art to which it appertains to make and use the same.

My invention has for its object to provide an extremely simple and highly efficient shock absorber especially adapted for use in connection with automobiles, and to this end, the invention consists of the novel devices and combinations of devices hereinafter described and defined in the claims.

The invention is illustrated in the accompanying drawings wherein like characters indicate like parts throughout the several views.

Referring to the drawings, Figure 1 is a view in side elevation showing the shock absorber connected between the upper and lower members of an elliptical spring, some parts being broken away; Fig. 2 is a transverse section taken on the irregular line $x^2$ $x^2$ on Fig. 1; and Fig. 3 is a transverse section taken on the line $x^3$ $x^3$ on Fig. 1.

The improved shock absorber may be applied in various different ways between spring-connected parts or members, but for the purpose of illustration, it is shown as directly connected between the upper and lower members of an ordinary elliptical or double elliptical spring, the said spring members, for such purpose, having rigidly clamped to their central portions, suitable lug clips 2.

The shock absorber is made up of two principal members, to-wit, a frictional segment 3 and a bifurcated or two-part frictional clamping arm 4. The segment 3 has a projecting arm 5 which, as shown, is pivotally connected to the upper lug clip 2, by a suitable bolt or coupling pin 6. The frictionally acting portion of the segment 3 is preferably made in the form of a segmental bar 7, which, at its central portion is much narrower than at its extremities, as best shown in Fig. 3. The two members which make up the frictional arm 4 are preferably in the form of tempered spring steel straps that embrace the segment 7 and are pivotally connected to the hub thereof by a bolt 8. The other or outer ends of the said straps are located between laterally spaced lugs of the lower lug clips 2, and are pivotally connected to said lugs (see Fig. 2) by a nut-equipped bolt 9, the head of which is seated in a perforation in one of the said lugs. The central portions of the spring straps which make up the said arms 4, are inwardly bulged at 4ª (see particularly Fig. 3) so that they are formed with ridges that directly engage the frictional faces of the said segmental bar 7.

By tightening or loosening the nuts of the bolt 9, the frictional tension between the straps of the arms 4 upon the frictional surfaces of the segmental bar 7 may be varied, so that the absorber may be set for proper co-action with different springs and with different loads which must be carried by the springs.

As is evident, the shock absorber may be applied, as shown, or may be inverted in respect to Fig. 1. Also, as is evident, when applied, it exerts a friction which retards both the compression and recoil of the spring or springs with which it is associated, and thus relieves the body of the vehicle from violent shocks and especially from those due to sudden recoil of the springs after extreme compression.

The shock absorber will be so set that when running on smooth roads, or roads that produce but slight vibrations of the springs, the lightest frictional resistance will be offered to movements of the springs because the members of the spring friction arms 4 are then engaged with the narrowest or thinnest portion of the segmental bar 7. The greater the vibration of the springs from normal positions, the greater will be the frictional resistance to such movements due to the increasing width of the segmental bar 7 in both directions of its central portion.

The shock absorber described is of very small cost, it may be very easily applied to automobiles and other vehicles, or spring-supported bodies, and furthermore, has, in practice, been found highly efficient for the purposes had in view.

In the drawings, the running gear and body of the automobile and vehicle are not shown, such parts not constituting spring-connected members. However, for the purpose of this case, the so-called lug clamps 2 may be treated as, and are, in fact, spring-connected members.

What I claim is:

1. The combination with relatively movable spring connected members, of an interposed frictional shock absorber comprising a frictional segment having an arm pivotally connected to one of said members, a pair of spring metal straps embracing and frictionally engaging said segment at their intermediate portions, both of said straps being pivotally connected to said segment, and to the other relatively movable member.

2. The combination with relatively movable spring connected members, of an interposed frictional shock absorber comprising a frictional segment having an arm pivotally connected to one of said members, a pair of spring metal straps embracing and frictionally engaging said segment at their intermediate portions, both of said straps being pivotally connected to said segment and to the other relatively movable member, and a nut equipped bolt at the pivotal connection between said straps and the latter noted relatively movable member, for varying the frictional engagement of said straps on said segment.

3. The combination with relatively movable spring connected members, of an interposed frictional shock absorber comprising a frictional segment having an arm pivotally connected to one of said members, a pair of spring metal straps embracing and frictionally engaging said segment at their intermediate portions, both of said straps being pivotally connected to said segment, and to the other relatively movable member, the intermediate segment engaging portions of said straps being inwardly bulged in cross-section, substantially as described.

In testimony whereof I affix my signature in presence of two witnesses:

FRIDOLIN SCHIMMEL.

Witnesses:
J. W. LE CROW,
ROBERT MEE.